May 28, 1968  D. CLEJAN ET AL  3,385,964
AUTOMATIC CAR SPEED CONTROL SYSTEM
Filed Feb. 2, 1966
5 Sheets-Sheet 1
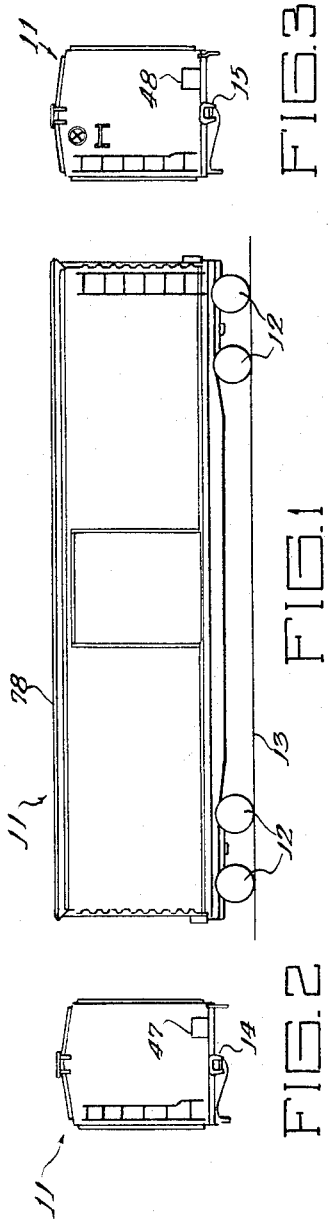
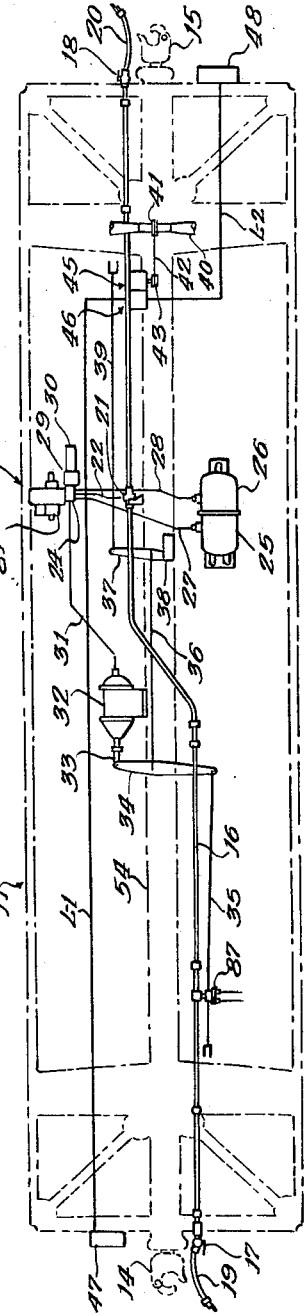
Inventors:
Deodat Clejan
Joseph A. Ferro
By: Zabel, Baker, York,
Jones & Dithmar
Attorneys

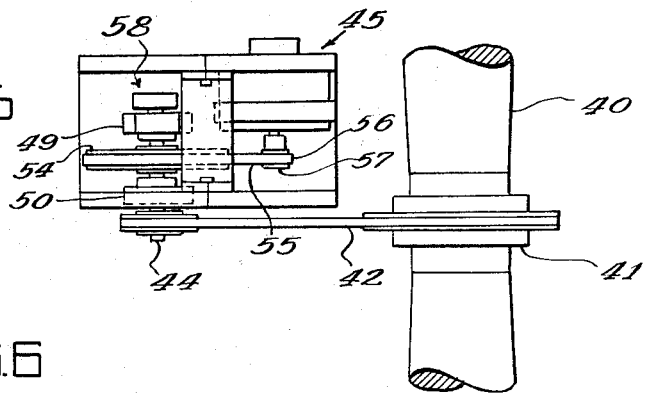
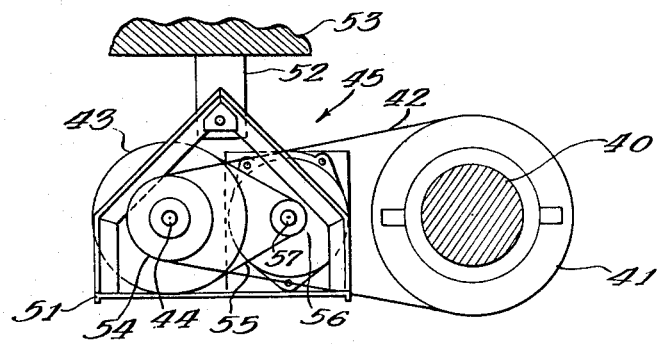
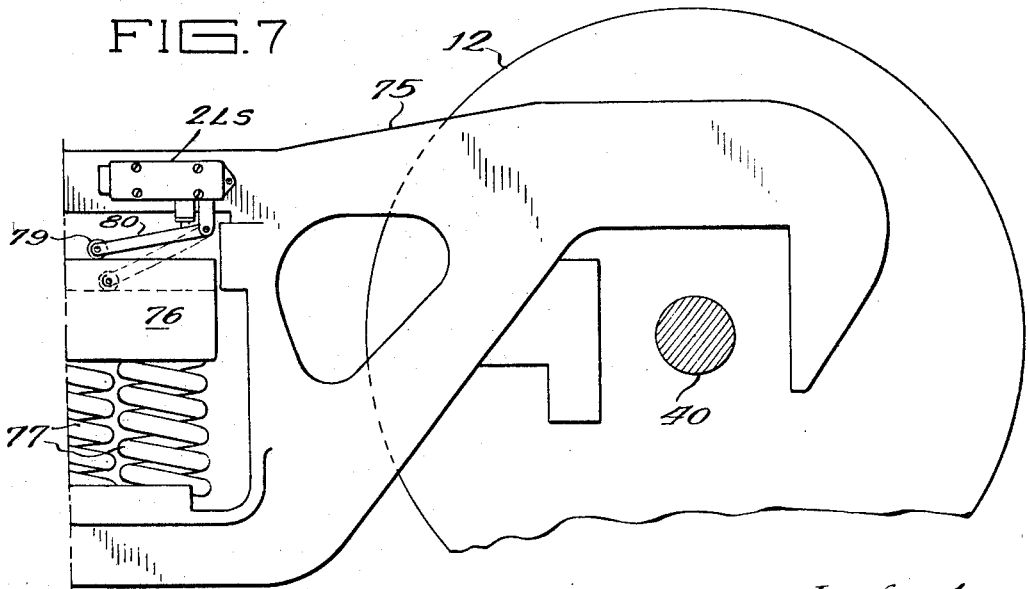

May 28, 1968 D. CLEJAN ET AL 3,385,964
AUTOMATIC CAR SPEED CONTROL SYSTEM
Filed Feb. 2, 1966 5 Sheets-Sheet 3
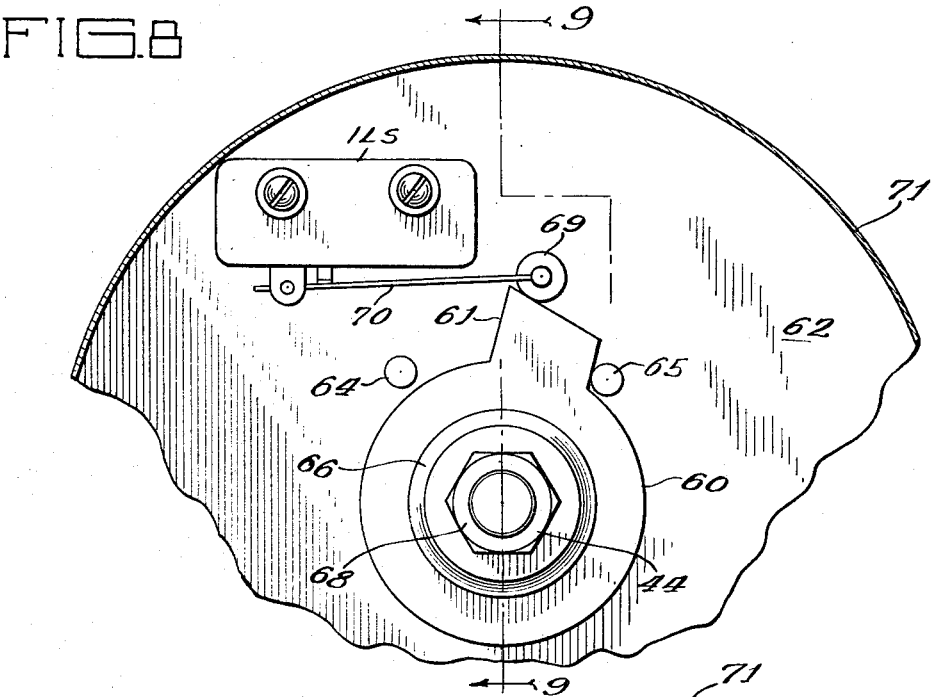
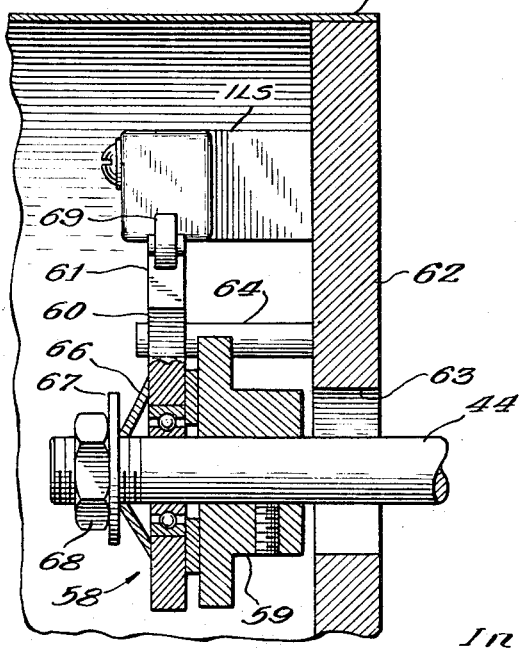
Inventors:
Deodat Clejan
Joseph A. Ferro

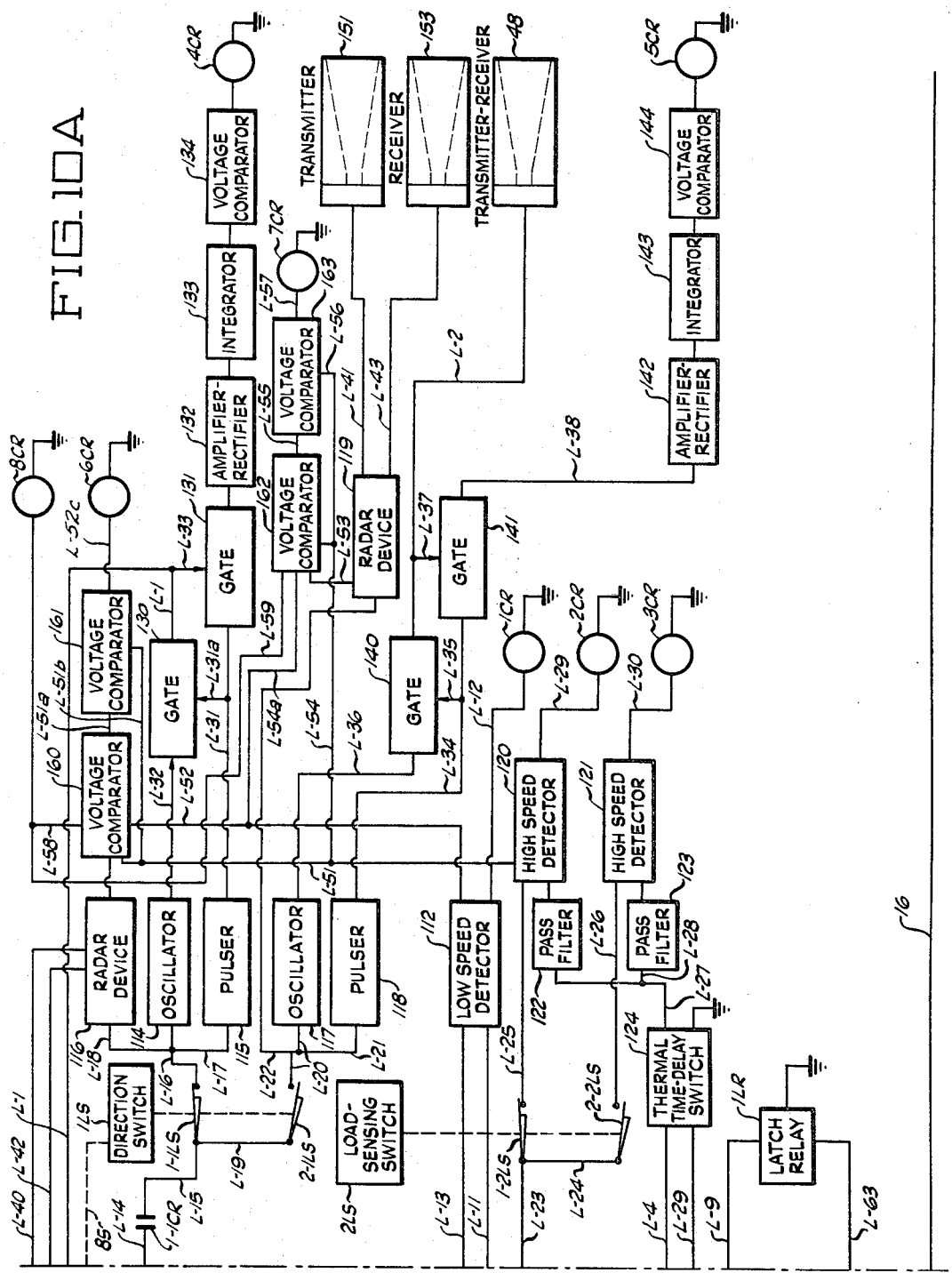

United States Patent Office 3,385,964
Patented May 28, 1968

3,385,964
AUTOMATIC CAR SPEED CONTROL SYSTEM
Deodat Clejan, Chicago, and Joseph A. Ferro, Park Ridge, Ill., assignors to General American Transportation Corporation, a corporation of New York
Filed Feb. 2, 1966, Ser. No. 524,385
27 Claims. (Cl. 246—182)

ABSTRACT OF THE DISCLOSURE

An automatic speed control system for a vehicle, that is free moving along a path to be coupled to another vehicle by impact, at the proper time reduces the speed of the moving vehicle, if necessary, to a safe coupling speed. This reduction in speed occurs when the system determines that the vehicles are a predetermined maximum distance apart. The system can also limit the speed of free movement to a predetermined maximum speed. It is useful in the classification of freight cars to make up a train.

This invention relates to an automatic car speed control system and more specifically relates to an automatic system for reducing, if necessary, the speed of a moving vehicle, such as a railway car, to a predetermined lower speed at which the moving vehicle can couple automatically to another vehicle in a safe manner, i.e., to a coupling speed in which the lading or goods being transported by either or both vehicles are not damaged by the coupling impact.

The system more particularly relates to control of the speed of a railway car in a classification yard, of either the flat or hump type, that generally has a relatively large number of classification or destination tracks connected by switches to a smaller number of intermediate or group tracks that are connected ultimately by other switches and tracks to a single track on which the car is humped or given sufficient speed to roll freely so that it would be capable of reaching the distal or far end of the ultimate classification track where it and other cars, that are destined for travel over a railway to places in the same direction from the yard, are automatically coupled to one another.

In a classification yard, as pointed out in U.S. Patent No. 3,125,315, freight cars individually are pushed over the crest of a hump and then allowed to roll under the influence of gravity down the hump and over a number of switches and track sections until it reaches a specific destination track. Other railway freight cars may already be on the same destination track and still other cars may follow the first-mentioned freight car to that destination track. Before the proper number of railway cars have reached a specific destination track, usually other cars have been humped and switched in a manner to reach one or more other destination tracks. Eventually various destination tracks contain a number of freight cars. The cars on a specific destination track will constitute a train, except for the locomotive and caboose, having a specific destination or set of destinations in the same general direction. The freights are in a linear arrangement so that one or more of them can be easily separated from the rest of the train at specific places along the route.

Each freight car is pushed over the crest of the hump with sufficient speed and the grade of the hump must be sufficient so that each car is capable of free rolling to the farthermost position on any destination track in the classification yard. This is the procedure followed even though the specific destination track to which the car will be sent, may already contain one or more freight cars so that the railway car being humped actually will not roll to the farthermost point on that destination track but will impact another car.

In view of the humping operation described above, it is apparent that each humped car must be decelerated before reaching the destination track so that its speed at the time it contacts for coupling a car already on that track will be only the minimum speed to provide the automatic coupling. When this coupling speed is higher than the minimum coupling speed, the impact of this moving car against a car already on the destination track will cause damage to the goods in the latter car.

To control the speed of the moving car in the main track section and in intermediate or branch track section where the car is free rolling the classification yard has brake retarders. In the early development of the classification yard using brake retarders they were under manual control. Brake car retarders are mounted along the track rails and include shoe beams that apply braking pressure to the rims of the car wheels. The one or more car retarders that are located along the main track are called hump retarders, while the additional car retarders included in the branch tracks are called group retarders. The retarder operator would control manually the amount of braking force initially provided by each retarder on a particular car in accordance with the weight of the railroad car. The amount of braking force depends on whether the car in an unloaded condition is a light car or a heavy car and whether the car is loaded or unloaded. Thus the overall weight of the car is a factor that must be considered by the operator. When the car is light and is unloaded the amount of braking force required can be very slight because it requires a higher speed in the zone of the hump retarder, and even in the zone of the group retarder than a heavy car loaded or unloaded and even a light car loaded. The car with the heavier total weight should reach the destination track at a slower speed than a lighter total weight car.

The retarder operator would determine the amount of braking force to be applied by considering various factors, but the manual operation was not entirely satisfactory to avoid damaging impact during coupling on the destination track. As a result many persons have made inventions, that are the subject of patents, in the field of automatic car retarder control systems. The automatic systems that have been developed automatically take into consideration numerous factors relating to car weight, car speed, rolling resistance, such as windage and temperature, and devices for determining the number of freight cars already on the destination track to which the free rolling freight car is being humped. One system takes into consideration the length and direction of curved track between the crest of the hump and the final destination track by incorporating in the main track a test section that includes equilateral turnouts connecting the ends of two laterally disposed stretches of curved track that have predominance of curvature in opposite direction. The rolling resistances in the test section and in a straight section of the main track are determined for each car and combined to produce a parameter which is stored and used at the proper time to control the proper group retarder when it applies a braking force to that car. For information regarding some of the numerous automatic retarder control systems, reference is made to the folowing U.S. patents: 2,814,996, 2,819,682, 2,859,-435, 2,907,022, 3,008,042, 3,054,891, 3,054,893, 3,056,-022, 3,089,029, 3,100,098, 3,100,461, 3,125,315, 3,200,-245, 3,200,246, 3,214,581. All of these systems are based on the use of devices along side of or between the tracks. None of them has completely eliminated damaging coupling impact.

It is an object of the present invention to provide a system that will control the speed of a free rolling freight car in a railroad classification yard so that the car will be prevented from impacting another car with a force sufficient to cause damage to the goods in the car being struck.

It is another object of this invention to provide an automatic system that can control the maximum speed at which a free rolling freight car is traveling so that the car can be slowed to a safe lower coupling speed at the proper time determined by the system, regardless of the number of cars already on the destination track of a railroad classification yard to which the moving car is being directed.

These and other objects of the present invention will be apparent from the description of a preferred embodiment of this invention when taken in conjunction with the drawings in which:

FIGURES 1, 2 and 3 are schematic side and end elevations of a freight car showing at each end of the freight car a transmitter-receiver of pulsed energy that is part of the automatic system of the invention;

FIG. 4 is a bottom plan, with numerous conventional parts removed, showing a conventional brake system modified with a brake control system of the present invention;

FIG. 5 is a bottom plan of the components of the present invention that provide electrical power, as D.C. voltage, and provide alternating current having a frequency that varies with the speed of the freight car;

FIG. 6 is an elevation of the components shown in FIG. 5, with both figures showing one of the car axles utilized to operate these components;

FIG. 7 is a fragmentary elevation of a freight car showing part of a truck side frame along with a truck bolster, truck springs and a limit switch that is part of one embodiment of the system of the present invention and that has contacts affected by the position of the truck bolster to indicate whether the freight car is loaded with goods or is empty;

FIG. 8 is a vertical cross section, taken to show the components inside a cover plate, of a direction-sensing means utilized in the preferred embodiment of the present invention and being one of the components shown in FIG. 5;

FIG. 9 is a cross section taken along the line 9—9 of FIG. 8; and

Figure 10:
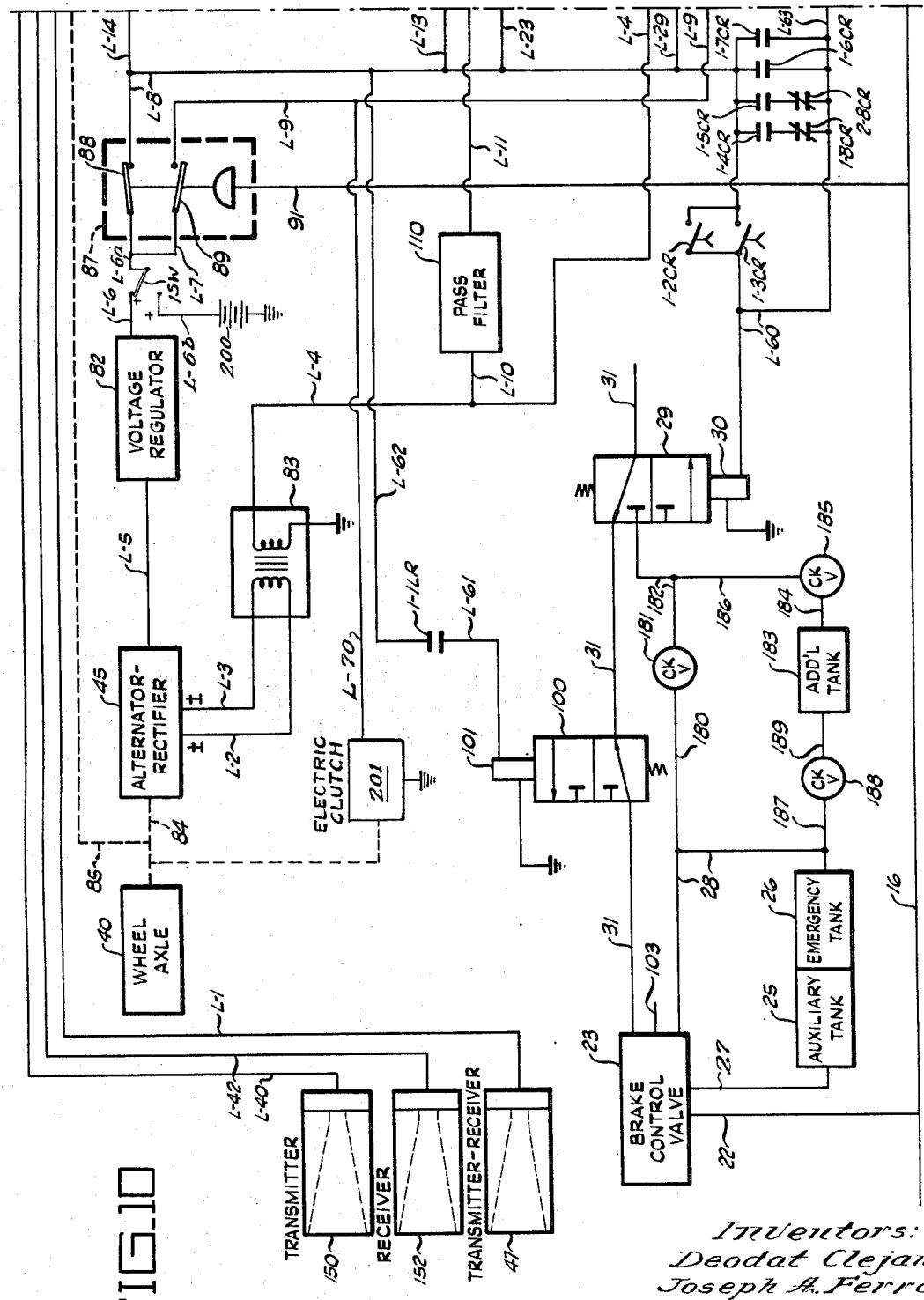

FIGS. 10 and 10A, taken together show schematically the overall mechanical, electrical and pneumatic system of the preferred embodiment of the invention and show also numerous additional devices that are incorporated in the system, when it is desired to provide additional functions by the control system.

The automatic system of the present invention is capable of reducing the speed of a moving vehicle, having a fluid brake system including a brake pipe and a brake coupling connected to the brake pipe to join the brake system to a brake coupling of a brake system on another vehicle, to a predetermined lower speed at which the moving vehicle can couple automatically to another vehicle in a safe manner. The automatic system comprises a number of components that are interrelated in their operation and are adapted to be mounted on the moving vehicle. A suitable example of the moving vehicle is a freight car. With this system it is not necessary to use the present automatic brake retarder control system including its many refinements. Of course, it would not be necessary to provide a new classification yard with the brake retarders and all of the other components needed to operate them whether manually or automatically.

It will be apparent from the description that follows, that part of the automatic control system of this invention can be utilized as a final control, subsequent to the speed control afforded by present automatic brake retarder control systems. For this utility the interrelated components can be stated broadly as comprising:

(1) pressure-sensitive means operable in response to a loss of fluid pressure in at least one of said brake coupling and said brake pipe of the moving vehicle to a predetermined maximum fluid pressure;

(2) power-operated speed-sensing means operable in response to a predetermined minimum speed of the moving vehicle;

(3) power-operated object-detecting means operable in response to detection of another vehicle in the path of travel of the moving vehicle within a predetermined maximum distance;

(4) power-operated means operable to alternatively apply and release braking means on said moving vehicle;

(5) electric power means adapted to operate said object-detecting means, said speed-sensing means and said power-operated means for said braking means;

(6) means operatively connecting said electric power means to said speed-sensing means upon operation of said pressure-sensitive means;

(7) means operatively connecting said electric power means to said object-detecting means upon operation of said pressure-sensitive means and of said speed-sensing means; and (8) means operatively connecting said electric power means and said power-operated means to apply said braking means only during the time and in response to the operation of said object-detecting means.

A railroad car does not have a front end and a rear end, because in a train it may be moving in either direction. Accordingly, for a practical utilization of the present automatic system for freight cars, each car will have two object-detecting means, one located at one end and the other located at the other end. This preferred embodiment of the present system includes a direction-sensing means to operate that object-detecting means mounted at the end of the car facing the direction in which the car is traveling and to render inoperative the other object-detecting means to reduce power consumption. The other object-detecting means is preferably rendered inoperative to avoid a collision of two moving cars being humped when the car behind is moving sufficiently faster than the other car to reach the maximum distance at which the object-sensing means on the slower car will apply the brakes to reduce its speed to the safe coupling speed. At the same time the faster car will detect the slower car and its brakes will be applied to reduce its speed to the safe coupling speed and neither car might not reach its intended destination on the classification track. However, in one modification of the car speed control system of the present invention each freight car is provided also with components that will cause the faster moving car to apply its brakes upon sensing the slower as a moving object if upon sensing that the relative speed is greater than a predetermined value.

The automatic car speed control system of this invention for use in a car classification yard that does not have the automatic car retarder control system further includes:

(1) second power-operated speed-sensing means operable in response to a predetermined minimum speed of the moving vehicle greater than said predetermined minimum speed at which said first-mentioned speed-sensing means is operable;

(2) means operatively connecting said electric power means to said second speed-sensing means upon operation of said pressure-sensitive means; and (3) second means operatively connecting said electric power means and said power-operated means to apply said braking means only during the time and in response to the operation of said second speed-sensing means. These additional components will monitor the speed of the free rolling humped car as it goes down the grade so that the car speed is limited to a predetermined maximum speed before it reaches a destination track end, of course, is limited, if necessary, to this predetermined maximum speed along the destination track. This second speed-sensing means is preferably adjustable so that it can be operable at either of two predetermined minimum speeds of the car and the system in that case further includes:

(1) weight-sensing means to discriminate between the weight of the moving vehicle in unloaded condition and the weight of the moving vehicle in loaded condition; and (2) means operable in response to the operation of said weight-sensing means indicating a loaded condition for the vehicle to operate said second speed-sensing means at the lower of said two predetermined minimum speeds.

It has been found desirable to conserve pressurized fluid, such as air, utilized in the braking system. To provide this, one embodiment of the system further includes: (1) power-operated time-delaying means to delay for a predetermined period of time the brake-applying operation of said second means operatively connecting said electric power means and said power-operated means to apply said braking means; and (2) power-operated means operative in response to the operation of said first speed-sensing means to operatively connect said electric power means and said time-delay means. With these components as part of the system the action is delayed, if the car, while it is going down the grade from the crest of the hump, exceeds the predetermined maximum speed desired in that zone of the classification yard. When the car being humped is a heavy car it requires considerable braking force, applied a number of times, to keep the heavy car at or below the predetermined maximum speed. Because of the time delay before the operation of the braking system after that speed is reached, the car actually can increase its speed further by several miles per hour before the brakes are applied so that the brakes will be kept in the braking condition for a longer period of time. As a result, fewer cycles of brake application and release are required to assure a maximum car speed at the exit of this zone will not be above the predetermined maximum speed. This reduced number of cycles of brake application and release minimizes the requirement for the pressurized fluid.

In the preferred embodiment of the system of the present invention there is also included components that provide an adjustability of the second speed-sensing means so that it can be operable alternatively at two predetermined minimum speeds of the moving car. In this case these components include: (1) weight-sensing means to discriminate between the weight of the moving vehicle in unloaded condition and the weight of the moving vehicle in loaded condition; and (2) means operable in response to the operation of said weight-sensing means indicating a loaded condition for the vehicle to operate said second speed-sensing means at the lower of said two predetermined minimum speeds. In this case the second speed-sensing means is provided with a duplication of certain elements which cooperate alternatively with the means that is operated by the weight-sensing means. This will be readily seen in the description that follows of the preferred embodiment and the drawings.

In a further embodiment of the system of this invention, there are also: (1) first and second power-operated relative speed-sensing means, having a transmitter and a receiver for wave energy at the ends of the moving vehicle and being operable in response to a vehicle ahead of the moving vehicle; (2) means selectively operable by said direction-sensing means to operatively connect said electric power means to that relative speed-sensing means, which is at the same end as the object-sensing means which is also operatively connected; (3) means to indicate the absolute speed of the moving vehicle; (4) means to indicate slower movement of a downstream vehicle by comparing said relative speed indicated by operation of one of said first and second relative speed-sensing means and the speed indicated by said absolute speed-indicating means; and (5) means responsive to operation of said speed-comparing means, indicating slower movement of the downstream vehicle, to operatively disconnect said means operatively connecting said electric power means to said power-operated brake-applying means, whenever the relative speed is less than the predetermined minimum speed at which said first-mentioned speed-sensing means is operative.

Referring to the drawings, that show the automatic speed control system of the present invention, a freight car generally indicated at 11 has wheels 12 that ride on tracks 13. The car 11 at its ends conventional car couplers 14 and 15 and a conventional braking system that includes a brake pipe 16 at the ends of which are connected angle cocks 17 and 18. The brake pipe 16 is connected to brake couplings 19 and 20 via cocks 17 and 18, respectively. Intermediate its ends brake pipe 16 has a branch pipe T 21. A branch pipe 22 is connected to T 21 and to a brake control valve generally indicated at 23 through a manifold 24. The use of brake control valve (hereinafter merely referred to as brake valve 23) is affected by manifold 24 and other new components as described later, but its normal use is unaffected.

The brake valve 23 can be any conventional type. An example of this valve is the AB valve manufactured by Westinghouse Air Brake Co. Its essential construction and operation are disclosed in U.S. Patent No. 2,031,213. Conventionally there are two sources of pressurized air, namely, an auxiliary tank 25 and an emergency tank 26, that are usually directly connected by pipes 27 and 28, respectively, to brake valve 23. In this embodiment of the invention pipes 27 and 28 are connected to brake valve 23 through manifold 24.

The brake system of the present invention includes a 3-way spring-urged, normally closed, solenoid-operated valve 29 with internal pilot operation. The valve 29 is operated by its solenoid 30. The manifold 24 is constructed so that pressurized fluid from tanks 25 and 26 communicate by pipes 27 and 28 with brake valve 23 in the same manner as heretofore, but pipe 28 is also in communication with 3-way valve 29 (see FIG. 10) for the purpose described later.

The manifold 24 is a plate that can be mounted flush with the outside surface of that face of the pipe bracket of the AB valve that contains outlets as shown in FIG. 2 of an instruction pamphlet No. 5062, referred to later. Normally pipe connections are bolted to that face of the pipe bracket, and the bolts pass through threaded holes in the face. The shape of the manifold plate is such that it does not cover the outlet of the auxiliary reservoir pipe connection. It does cover the other four outlets. Thus holes are drilled on the outside face of the manifold plate. The three holes through the manifold plate are for the branch brake pipe inlet, emergency reservoir inlet and the outlet to the pressure retainer valve. In alignment with the emergency reservoir inlet of the pipe bracket and thus with each other a hole is drilled from each side, but these holes do not communicate with each other. From an adjacent edge of the manifold three holes are drilled at right angles, one to the hole through the manifold plate for the emergency reservoir inlet and the other two to the two holes from opposite faces in alignment with the brake cylinder outlet so as to communicate with these holes. Thus there are provided at this edge three holes that communicate with the three ports of 3-way valve 29. One provides continuous communication between one of the ports and the emergency reservoir, i.e., tank 26. One of the other two ports thereby communicates with brake cylinder 32 by a section of brake control pipe 31 and the third port thereby communicates with valve 23 by another section of pipe 31. Because the opposite holes are not drilled through there is only communication between cylinder 32 and a brake release device (described later) of brake valve 23 via valve 29, when solenoid 30 is deenergized. This construction is not shown in the drawings because it is a mere matter of engineering design of manifold valve construction. Other alternative constructions will be obvious. The particular manifold was designed primarily to minimize the amount of space utilized under car 11.

The conventional braking system for car 11 further includes brake control pipe 31 communicating with brake valve 23, in the present instance through manifold 24, and connected at the other end to conventional brake cylinder 32 having a piston rod 33 which is pivotally connected at its end outside cylinder 32 to a floating link 34. The other end of link 34 is pivotally connected to a bar 35 and intermediate its ends link 34 is pivotally connected to a rod 36 which is pivotally connected to a link 37 intermediate its ends. The rod 36 is pivotally connected at one end to a fixed support 38 and at its other end there is pivotally connected to it a bar 39. The other ends of bars 35 and 39 are connected to links (not shown) that are part of the rest of the mechanism for operating the brakes at each end of car 11. For a complete description of a conventional braking system, including the hand brake that can set the brakes independently of the operation of the main brake cylinder, reference is made to U. S. patent No. 3,163,128.

As seen partially also in FIG. 4, one of the truck axles 40 has a split V-belt sheave or pulley 41 fixedly mounted on it. A V-belt 42 is driven by sheave 41 to rotate a V-belt sheave 43 fixedly mounted on a shaft 44. An alternator-rectifier is generally indicated at 45. For convenience most of the electrical control components of the system of this invention, other than alternator-rectifier 45, are adjacent to the latter and are also shown in a box outline in FIG. 4 and generally indicated at 46. This control system by lines L1 and L2 is connected to transmitter-receivers 47 and 48, respectively, which provided pulsed wave energy to sense an object within a predetermined range of distance from the respective ends of car 11. All of the components mentioned so far as part of the conventional braking system and additional components that are part of the system of the present invention are mounted on the underside or the ends of car 11 in a manner that will provide suitable clearance as required by the specification of the American Association of Railroads. FIGURES 1 through 4 show transmitter-receivers 47 and 48 at the ends of car 11.

In FIGS. 5 and 6 the speed-sensing means is shown in greater detail. The shaft 44 is rotatably supported by bearings 49 and 50 mounted on a support 51 pivotally mounted on and supported by a bracket 52 mounted on and supported by center sill 53 of car 11. Another pulley 54 is fixedly mounted on shaft 44 and by timing belt 55 drives a pulley 56 that is mounted on a shaft 57 of alternator-rectifier 45.

A direction-sensing means is generally indicated at 58 and its detailed construction is shown in FIGS. 8 and 9. The driving plate 59 of a slip clutch is mounted on and driven by shaft 44. The driven plate 60 of the slip clutch has an extension 61 at a portion of its periphery to function as a switch actuator. A fixed plate 62 having an aperture 63, through which extends shaft 44, has mounted on it stop pins 64 and 65 in the path of travel of extension 61 of driven plate 60. The clutch plate 60 is held in operative position by spring 66 backed up by washer 67 and nut 68 on the threaded end of shaft 44.

When shaft 44 rotates clutch plate 59 in one direction driven clutch plate 60 and its extension 61 will be rotated in the same direction until extension 61 hits one of stop pins 64 and 65. As viewed in FIG. 8, when this rotation is clockwise pin 65 stops rotation of clutch plate 60. When shaft 44 rotates counterclockwise pin 64 is abutted by extension 61 to stop further rotation of clutch plate 60. The outermost surface of extension 61 is contoured to lift a cam follower 69 mounted on the end of an arm 70 of a limit switch 1LS, when extension 61 abuts pin 65. When extension 61 is stopped by pin 64, arm 70 can pivot downwardly for the other operation of switch 1LS. The direction-sensing means has a cover 71 mounted on plated 62 to keep the various components clean.

The load-sensing means of this invention includes a limit switch 2LS mounted on one of truck side frames 76 of car 11 that are supported by wheels 12 by bearings (not shown) mounted on axle 40. Two truck side frames 75 support a truck bolster 76. The bolster 76 is kept in an elevated position by truck springs 77 which vary in rod size and spring length depending upon the weight of the car body 78 of car 11 and the weight of contents in car 11. The truck bolster 76 supports a body bolster (not shown) that is carried by the center sill 54. The truck bolster is deflected downwardly when car 11 is loaded with goods to a position illustratively shown in phantom line in FIG. 7, whereby a follower 79 on an arm 80 is pivotally mounted on limit switch 2LS. As seen later, switch 2LS has two contacts, one of which is closed when bolster 76 is in the weight-deflected condition. For a construction of truck bolsters, etc. shown in FIG. 7, except for switch 2LS and its arm 80 and followers 79, reference is made to page 781 of Car Builder's Cyclopedia of American Practice, 21st edition, compiled and edited for the Association of American Railways—Mechanical Division and published and printed (1961) by Simmons-Boardman Publishing Corp., New York, N.Y.

The brake valve 23 can include a brake cylinder release valve device 81 (see FIG. 4) that can vent brake cylinder 32 to release the car's brakes. This release device is conventional and is shown in U.S. Patents Nos. 2,392,185 and 3,001,833. A conventional release valve device is Westinghouse Air Brake Company's QRR release valve. When it is incorporated as part of their AB brake, the latter is referred to as AB/QRR brake valve. The AB brake without the release device is also described in "'AB' Freight Brake Equipment" published as instruction pamphlet No. 5062 in December 1945 and reprinted with revisions in June 1958 by Westinghouse Air Brake Company, Wilmerding, Pa. The release valve 81 provides for an improved release of the brakes by which brake cylinder 32 on car 11 can be vented in bypass of part of brake control pipe 31 without depleting the pressure in a fluid pressure source, either tank 25 or tank 26 which may then be connected to control pipe 32 by brake valve 23.

The alternator-rectifier 45 shown in FIG. 4 by a box outline is shown also in FIG. 10. Within the box outline there is also a voltage regulator 82 and an isolation transformer 83. For simplicity in FIG. 10 a belt drive 84 which is the entire drive mechanism includes axle 40, pulleys 41, 43, 54 and 56, shaft 44, and belts 42 and 55, as described earlier. Also shown in phantom lines is an auxiliary belt drive 85 that may be considered as representing shaft 44 that operates the slip clutch.

The alternator-rectifier 45 is a conventional 3-phase unit with built-in rectifiers. The voltage regulator 82 is also conventional and controls the D.C. voltage output of alternator-rectifier 45 by varying the current in the rotor coil (not shown) of the alternator. A.C. (frequency) signals are obtained from the alternator stator (not shown) and are isolated from ground by isolation transformer 83 to which alternator-rectifier 45 is connected by lines L-2 and L-3. The isolation transformer 83 provides to a line L-4 an alternating current having a frequency that increases with an increase of rotation of axle 40 and thus varies directly with the speed of car 11.

A pressure switch, shown in FIG. 10 in phantom box outline, and indicated generally as 87 is also seen in FIG. 4. The pressure switch 87 has a normally-closed contact 88 and a normally-open contact 89. A line L-6 connects contact 88 with voltage regulator 82 via a switch 1SW and a line L-6a. A line L-7 is connected to line L-6a and to contact 89 to connect the latter to voltage regulator 82. The other terminals of contacts 88 and 89 are connected to lines L-8 and L-9 respectively.

The pressure switch 87 is operated to open contact 88 and close contact 89 at the predetermined minimum pressure, which in the preferred embodiment utilized in connection with a freight car is a pressure of about 10 p.s.i.g., so that this value is substantially below the pressure at which automatic emergency braking operation occurs in a freight train upon the loss of sufficient pressurized air in the brake system that is conventionally used.

When the train is operating the pressure in brake pipe 16, brake couplings 19 and 20, and pipe 22 have a pressure that is very substantially above 20 p.s.i.g., i.e., 75 to 90 p.s.i.g. Thus either line L-8 or line L-9 is provided with a constant D.C. voltage. The line that is thus provided at a particular time is dependent upon whether the pressure in switch 87 connected by a short pipe 91 (FIG. 10) to brake pipe 16 is at least the predetermined minimum pressure above atmospheric, i.e., in the illustrative example is 10 p.s.i.g.

In FIG. 10 brake control pipe 31 connecting valve 23 to brake cylinder 32 has been modified so it is no longer in one continuous length. Two sections have been cut out of pipe 31 so that 3-way valve 29 and an identical type of solenoid-operated valve 100, having a solenoid 101, are interposed so that with solenoids 30 and 101 de-energized the three sections remaining of pipe 31 are communicating with one another. The conventional AB valve has included in its construction a pressure-retaining valve that is connected to valve 23 by an outlet and by a pipe 103. As described in instruction pamphlet No. 5062 mentioned above, the standard retaining valve for freight equipment cars is a three-position 10-20 pound duplex spring type of retaining valve having nominal blow-down value of 50 seconds in the 10-pound position and 90 seconds in the 20-pound position. It includes a cock key (not shown) and the third outlet is to the atmosphere.

The alternating current in line L-4 passes through a line L-10, a pass filter 110, a line L-11 to a low-speed detector 112 that converts alternating-current frequency to a D.C. voltage. When this voltage is slightly higher than that representing the safe coupling speed, a D.C. voltage is fed by a line L-12 to the coil of a relay 1CR that is connected also to ground potential. A D.C. supply voltage is furnished detector 112 by a line L-13 that is connected to line L-8. In the car classification operation limit switch 87 has its contact 88 closed because the pressure in brake pipe 16 is below 10 p.s.i.g. so that D.C. power is being fed to detector 112 while the car is free rolling in the classification yard. The frequency of the alternating current being fed to detector 112 includes all frequencies that represent speeds of car 11 above the safe coupling speed, which for purpose of illustration is deemed to be 3 miles per hour. Frequencies below the frequency obtained with car speed of 3 miles per hour are filtered out by pass filter 110. This circuit senses a speed in excess of the safe coupling speed.

When car 11 is moving at a speed greater than 3 miles per hour and when the brake pipe has an air pressure less than 10 p.s.i.g., which is the case in the classification yard, D.C. power supply can be furnished to a circuit containing a line L-14, a normally-open contact 1-1CR of relay 1CR, a line L-15, a limit switch contact 1-1LS of direction switch 1LS, a line L-16 to an oscillator 114. Lines L-17 and L-18 connect line L-16 to a pulser 115 and a radar device 116, respectively. Another circuit that includes a line L-19, which is connected to line L-15, the other limit switch contact 2-1LS of switch 1LS and line L-20 which is connected to an oscillator 117. A pulser 118 and a radar device 119 are connected to line L-20 by lines L-21 and L-22, respectively. The limit switch contact 1-1LS is closed when the car is going in one direction and is open when the car is going in the other direction. The opposite is true for limit switch 2-1LS. The two oscillators 114 and 117 and the two pulsers 115 and 118 represent part of the circuits for object-sensing whereas the circuits with the two radar devices represent part of the two relative speed-sensing means.

A line L-23 is connected to line L-8 and to one terminal each of the two switch contacts 1-2LS and 2-2LS of load-sensing switch 2LS. This later connection is provided by line L-24 to switch 2-2LS. The other terminals of switch contacts 1-2LS and 2-2LS are connected by lines L-25 and L-26 to a high-speed detector 120 and a high-speed detector 121, respectively. The line L-4 provides A.C. current to pass filters 122 and 123 through a thermal time-delay switch 124. The connection between switch 124 and pass filter 122 is by line L-27 and to pass filter 123 is by lines L-27 and L-28. The line L-8 via a line L-29 provides D.C. voltage to switch 124 when contact 88 is closed, which indicates a pressure in the brake pipe 16 of about 10 p.s.i.g. or less. The D.C. current through switch 124 is connected to ground potential. The reason for the delay of about 20 seconds, for example, is described later.

The high-speed detectors 120 and 121 are connected by lines L-29 and L-30 to coils of relays 2CR and 3CR, respectively. These coils are connected also to ground potential. The pass filter 123 passes only frequencies of alternating current provided by transformer 83 that represent a speed of loaded car 11 of at least about 8 m.p.h., for example; thus frequencies that represent a car speed between about 3 m.p.h. and a speed just below about 8 m.p.h. are not passed by filter 123. The pass filter 122 passes only frequencies of alternating current provided by transformer 83 that represent a speed of unloaded car 11 of at least about 11 m.p.h., for example. The detectors 120 and 121 convert alternating current frequency to D.C. voltage. Thus, when car 11 is loaded and is traveling at least about 8 m.p.h., filter 122 passes alternating current to detector 120 which converts the alternating current to a D.C. voltage that flows through the coil of relay 2CR. Similarly, when unloaded car 11 is free rolling at a speed of at least 11 m.p.h., alternating current is fed to detector 121 and is converted to a D.C. voltage, which passes through the coil of relay 3CR.

The relays 2CR and 3CR have normally-open, time-closing contacts 1-2CR and 1-3CR, respectively. These contacts are in parallel circuits as explained later.

These circuits for the low-speed detector and for the two high-speed detectors operate on the principle of converting an alternating current of a particular minimum frequency to a D.C. voltage which flows through an armature of a relay to close contacts of the relay during such current flow. Various circuits have been developed for this purpose. Some use this principle of a pass filter which determines the minimum frequency of A.C. current that is converted to D.C. voltage by a frequency to voltage converter. Pass filters are well known. A frequency-to-voltage converter is described in U.S. Patent No. 3,099,799.

One can use a frequency detector that employs a circuit which converts a signal frequency to a proportional D.C. output voltage in combination with an overvoltage relay. The frequency detector will provide D.C. voltage that increases with and thus represents the speed of car 11. This voltage will operate the overvoltage relay at slightly above the predetermined speed and faster. Thus the circuits can be provided to energize relays 1CR, 2CR and 3CR by proper choice of constants of these components, namely, frequency detector and overvoltage relay.

A commercial frequency detector is Statitak frequency detector made and sold by Crydom Laboratories, Inc., Garden Grove, Calif. It is described in Crydom's Technical Bulletin 14–5 released February 1, 1961. Instead of using an overvoltage relay an ordinary relay can be connected to the frequency detector via a D.C. level detector (such as described by Crydom in its Technical Bulletin 15–5) that will operate the normal relay only when the D.C. voltage is at least a predetermined minimum. In these alternative systems, pass filters are not required.

To operate relays 1CR, 2CR and 3CR in an alternative speed-sensing system, we have used for each circuit that operates these relays the following circuitry. A monostable multivibrator is provided with a power source, such as from alternator 45 and receives alternating current, such as from transformer 83. The output of the multivibrator is integrated to supply a D.C. level proportional to the rate of incoming pulses provided to the multivibrator by the alternating current. The D.C. supply voltage, such as from voltage regulator 82, is further regulated in the speed detector by a variable diode connected to ground potential. The alternating current is clipped by two diodes in a subcircuit to form a square wave. This is differentiated by a subcircuit containing a capacitor. The period or pulse duration of two transistors, that form the multivibrator, are in circuitry with a resistor and a capacitor. Its output across a resistor is integrated by a capacitor, also connected to the D.C. power source to provide a basic D.C. level for a third transistor. A fourth transistor is in a subcircuit with the third transistor and provides a voltage comparator whereby the foregoing output is compared to a fixed reference voltage which is obtained from the D.C. power source, such through voltage regulator 82, but using further an adjustable voltage regulator. A coil of a relay and a diode are in series with each other and connect the third and fourth transistors. As the voltage in the third transistor decreases to a value less than that in the fourth transistor current flows through the coil of the relay to operate the relay.

The oscillator 114 of one object-sensing ranging circuitry operates continuously when D.C. current is provided by alternator 45 through line L–5, voltage regulator 82, contact 88, line L–14, contact 1–1CR (when closed), line L–15, contact 1–1LS and line L–16. The pulser 115 produces a voltage pulse to a line L–31 and then by a line L–31a to a gate 130 which is also connected by a line L–32 to oscillator 114.

Whenever a pulse is provided by pulser 115, a pulse of wave energy having the frequency provided by oscillator 114 is transmitted by line L–1 to transmitter-receiver 47 at one end of car 11. The oscillator 114, and of course oscillator 117, preferably provide ultrasonic wave energy. The preferred frequency is between 20,000 and 40,000 cycles per second. The transmitter-receiver 47 uses a conventional transducer, such as barium titanate, to convert the electrical signal having the indicated frequency into a sound signal having approximately the same frequency. This sound signal is propagated into space and by well known horn design it can be directed primarily toward the desired target, namely, another freight car on the same track and ahead of moving car 11.

The time duration of each burst of sound signal and the time between bursts are chosen so that echos returned from the target are received by transmitter-receiver 47 and are converted to an electrical signal in the well known manner and the latter is sent through line L–1 and a line L–33 to another gate 131 which transmits only at predetermined intervals of time the electrical signals that represent the echo pulse from a given range of distance to an amplifier-rectifier 132. The amplifier-rectifier 132 amplifies and rectifies the A.C. current of each pulse received to provide a D.C. voltage. These D.C. voltage pulses are fed to an integrator 133 which will provide a D.C. voltage to a voltage comparator 134, only if the integrated value of all received pulses in a given time as D.C. voltage equals the predetermined value that would result from each pulse from an object that remains in the path of travel of the sound signal for the entire given time. Thus integrator 133 rules out false echo signals caused by objects, such as a man, moving across the path of travel of the ultrasonic sound signal for part of the duration of a predetermined number of pulses.

The D.C. voltage given by integrator 133 to voltage comparator 134 equals or differs from a fixed reference voltage by a predetermined amount, dependent upon the design of the circuit, comparator 134 operates a relay 4CR by furnishing D.C. current to its coil which is connected to a ground potential.

Similarly, for the other object-sensing ranging circuitry, oscillator 117 and pulser 118 by a gate 140 connected to pulser 118 by lines L–34 and L–35 and connected to oscillator 117 by a line L–36 is connected by line L–2 to transmitter-receiver 48 to transmit pulses of wave energy, such as ultrasonic energy from the other end of car 11. By line L–2 and a line L–37 an echo pulse is converted by transmitter-receiver 48 to a pulse of alternating current to line L–2 and then to line L–37 to a gate 141 and then only if received at predetermined intervals of time through a line L–38 to an amplifier-rectifier 142. The pulses of D.C. voltage from amplifier-rectifier 142 are transmitted to an integrator 143 which indicates the proper summation of D.C. voltage pulses in a given time, as in the case of integrator 133, by furnishing D.C. voltage to a comparator 144 where the D.C. voltage is compared to the same fixed reference voltage used for voltage comparator 134. The voltage comparator 144 operates in the same manner as voltage comparator 134 to provide a D.C. voltage to the coil of a relay 5CR which is also connected to ground potential.

FIG. 10A shows the unnumbered lines, connecting in series, gate 131, amplifier-rectifier 132, integrator 133, voltage comparator 134 and relay 4CR. Amplifier-rectifier 142, integrator 143, voltage comparator 144 and relay 5CR are also connected in series by unnumbered lines, as seen also in FIG. 10A. For those components that require D.C. power, it is furnished by alternator-rectifier 45 through regulator 82 by lines (not shown).

The gates 131 and 141 prevent flow of pulses of alternating current to amplifier-rectifiers 132 and 142, respectively, when gates 130 and 140 provide pulses of alternating current to transmitter-receivers 47 and 48 and only allow pulses of alternating current to flow to amplifier-rectifiers 132 and 142 in the time intervals when echo pulse sound signals would be received from a target within a predetermined range of distance and converted to an electrical signal as a pulse of alternating current. When gates 131 and 141 are open, gates 130 and 140 are closed to prevent flow of A.C. current from oscillators 114 and 117 to amplifier-rectifiers 132 and 142, respectively.

The object-sensing ranging systems can be conventional using conventional equipment having the proper constants and using pulses of wave energy, e.g., ultrasonic energy and high frequency wave energy. The wave energy is preferably ultrasonic energy. Sonar ranging systems are well known. Such a unit is made and sold by Arma Division, American Bosch Arma Corporation, and is described as a sonic height sensor in their Product Information Bulletin No. 6302 for a short-range destination measurement. It utilizes ultrasonics to sense a target within the maximum distance of 75 feet and is adjustable. Its frequency of sound energy is about 20,000 cycles per second. The specifications of this unit can be altered within the skill of the art.

A ranging system has been tested on behalf of the present applicants to provide a signal indicating a target at a predetermined distance. Other ranging systems are available to detect targets that are present within a fixed range of distance from the transmitter-receiver. For example, U.S. Patent No. 3,214,729 shows a pulsed ultrasonic detector. It happens to use separate transmitter and receiver, but the use of separate elements is unnecessary. The system of that patent can discriminate between a car and a truck, because their roofs are at different heights, with the roof of the truck being much closer to the overhead transmitter and receiver.

In the preferred embodiment a sonar device is used in the object-sensing system and a ranging system, but as stated above other pulsed wave energy can be utilized, for example, a radar device. An example of such ranging system is described in U.S. Patent No. 3,175,214. Reference is also made to U.S. Patent No. 2,580,560.

The radar device 116 of one of the relative speed-sensing systems provides high frequency alternating current through a line L–40 to a radar transmitter 150 which transmits high frequency energy at one end of car 11 whereas radar device 119 of the other system by a line L–41 provides high-frequency alternating current to a transmitter 151 mounted at the other end of car 11. Each radar device is operative only when the car is going in the direction that the end of car 11 mounting the transmitter is facing.

When another car is in the path of travel of car 11, the wave energy from transmitter 150 or 151 will be reflected. The reflected wave energy will be picked up by a receiver 152 or 153. They are connected by lines L–42 and L–43 to radar devices 116 and 119.

Radar devices for measuring relative speed between two objects, one being the object containing the transmitter and receiver and the other being the object reflecting the wave energy, are well known. Ultrasonic energy has also been used as a relative speed measurement device. Again the Doppler principle is employed. A recent example of an ultrasonic Doppler speed measurement device is described in U.S. Patent No. 3,202,960.

The radar device 116 is also connected to a voltage comparator 160. The radar device 116 provides, as a D.C. voltage, an indication of the amount of the shift in frequency by the Doppler effect. The voltage comparator 160 subtracts from D.C. voltage, that is received from high-speed detector by a line L–51 and that represents the actual speed of car 11, the D.C. voltage from radar device 116 and adds a D.C. voltage, that is received from low-speed detector 112 by a line L–52 and that represents the safe coupling speed. The comparator 160 thus provides a D.C. voltage representing the sum of the slower speed of the car ahead and the safe coupling speed. Of course, the maximum safe coupling speed as voltage can be obtained also from line L–14 through a resistor (not shown). This voltage is fed by a line L–51a to another voltage comparator 161 which subtracts from this voltage the D.C. voltage received by a line L–51b connected to high-speed detector 120 by line L–51. The comparaor 161 indicates the difference, if any, by a D.C. potential through a line L–52c to the coil of a relay 6CR that is also connected to ground potential. This circuitry provides, with radar device 116 and transmitter 150 and receiver 152, the operation of relay 6CR when the speed of car 11 is such that (1) it is catching up to a slower moving vehicle, such as also going to the classification track, and (2) will impact it at an unsafe coupling speed. The energization of the coil of relay 6CR applies the brakes, as explained later, through the closing of a normally-open contact 1–6CR of relay 6CR.

Similarly, radar device 119 provides a D.C. voltage through a line L–53 to a voltage comparator 162 where the voltage is subtracted from a voltage received from line L–51 through a line L–54 connected to line L–51 and to which is added the voltage from line L–52 by a line L–54a. The resultant voltage is provided by comparator 162 through a line L–55 to a voltage comparator 163 where it is compared with a D.C. voltage provided by a line L–56 connected to line L–54. The voltage difference, if any, is provided by comparator 163 through a line L–57 to the coil of a relay 7CR which indicates, when car 11 is going in a direction of travel, opposite to that using radar device 116 for relative speed-sensing, but to a classification track, that it is approaching another but slower moving vehicle at a speed such that it will provide an impact coupling in an unsafe manner. The energization of relay 7CR applies the brakes, as explained later, through the closing of a normally-open contact 1–7CR of relay 7CR.

The voltage comparators 160 and 162 also compare the D.C. voltage representing the actual speed of car 11 with the D.C. voltage representing the relative speed and when the former is greater than the latter a D.C. voltage, indicating the car ahead is moving, is fed through a line L–58 or through line L–59 and line L–58, respectively, to a coil of a relay 8CR that is connected to ground potential. The relay 8CR has normally-closed contacts 1–8CR and 2–8CR are the two subcircuits, mentioned below, that contain contacts 1–4CR and 1–5CR.

Referring now to FIG. 10, line L–8 is connected to a line L–60 by six parallel subcircuits, each containing one normally-open contact of a relay. In four of the subcircuits the contact is of the normally-open type, whereas the contacts in each of the two other subcircuits is a normally-open, time-closing contact. The four normally-open contacts are contacts 1–4CR, 1–5CR, 1–6CR and 1–7CR of relays 4CR, 5CR, 6CR, 7CR, respectively. The normally-open, time-closing contacts in the other two subcircuits are contacts 1–2CR and 1–3CR of relays 2CR and 3CR, respectively.

The line L–60 is connected to solenoid 30 of solenoid valve 29. Thus solenoid 30 is energized when any one of the following six conditions is met:

(1) The high-speed detector 120 indicates that an unloaded freight car, on which it is mounted, is operating at the speed, illustratively 11 m.p.h., of at least that represented by the minimum frequency passed by filter 122, i.e., by closing contact 1–2CR after a delay;

(2) The speed of loaded car 11 is at least the speed, illustratively 8 m.p.h., necessary to provide the minimum frequency that will pass filter 123 to operate high-speed detector 121 and thereby close contact 1–3CR after a delay;

(3) The car 11 going in one direction senses an object within a predetermined range of distance to energize relay 4CR and thereby close contact 1–4CR;

(4) When car 11 going in the opposite direction senses an object within the predetermined range of distance to energize relay 5CR and thereby close contact 1–5CR;

(5) The radar device 116 and associated components energize relay 6CR to close contact 1–6CR to indicate that car 11 is catching up to another moving car at an unsafe relative speed; and (6) The radar device 119 and associated components energize relay 7CR to close contact 1–7CR when car 11, going in the opposite direction, senses another car traveling at a slower speed and the relative speeds are such that car 11 will impact the car moving ahead at an unsafe coupling speed, as in condition (5).

FIG. 10 shows valve 29 in its unenergized condition in which two sections of control pipe 31 are communicating with each other through valve 29. One section of pipe 31 is connected to valve 100 which, when solenoid 101 is not energized communicates this section of pipe 31 with that section of pipe 31 connected to the control pipe outlet of brake control valve 23.

When it is not desired to obtain quicker pressure release of brake cylinder 32 than afforded by the quick release brake device of the QRR type associated with the brake control valve 23, as explained above, solenoid valve 100 is not interposed between two parts of pipe 31 and thus, of course, pipe 31 does not have a section taken out of it to interpose valve 100. However, to provide a faster rate of releasing the brakes of car 11 by releasing fluid pressure in brake cylinder 32, valve 100 is used and its solenoid 101 is energized when a normally-open contact 1–1LR is connected by a line L–61 to solenoid 101 and by a line L–62 to line L–8.

The latch relay 1LR (see FIG. 10A) is connected to ground potential and is connected by line L-9 to contact 89 so relay 1LR will release, if energized, and thereby open contact 1-1LR. This will occur when contact 89 of pressure switch 87 is closed upon the pressure in brake pipe 16 being increased to and above 10 p.s.i.g. The latch relay 1LR is energized and thus latched when D.C. voltage is applied to a line L-63 that is connected to line L-60. The line L-63 is provided with a D.C. potential, after contact 88 closes indicating that the pressure in pipe 16 has been reduced to the maximum value of 10 p.s.i.g., but not until a signal to solenoid 30 is obtained by the closing of any one of contacts 1-2CR, 1-3CR, 1-4CR, 1-5CR, 1-6CR and 1-7CR. By this arrangement, valve 100 does not affect normal train operation. Of course, if it is decided not to fast exhaust or vent brake cylinder 32, valve 100, solenoid 101, latch relay 1LR, contact 89 and associated electrical lines are not used.

The pipe 28 from emergency tank 26 is communicating, via manifold 24, with a pipe 180 which is connected to a valve 181 to which is also connected a pipe 182 that communicates with one of the inlet ports of valve 29. When solenoid 30 is energized, tank 26 is thus in communication with the section of pipe 31 that is connected to brake cylinder 32. Pressurized fluid in emergency tank 26 flows through pipe 28, pipe 180, valve 181, pipe 182, valve 29 and this section of pipe 31 connected to brake cylinder 32 to apply the brakes of car 11. The valve 181 is a check valve installed to allow only flow of fluid from pipe 180 to pipe 182.

The valve 181 is present to prevent leaky control valve 23 from bleeding tank 183 while car 11 is standing for long periods of time.

It is desirable to use an additional tank of pressurized fluid that is obtained from the normal system of providing pressurized fluid to tanks 25 and 26 from the locomotive of a train. As is well known, when this pressurized fluid is provided through pipe 16 on each car, the auxiliary tank 25 and emergency tank 26 are furnished pressurized fluid through brake control valve 23. The emergency tank 26 is fed through pipe 28. In this alternative, a third tank 183 furnishes pressurized fluid to cylinder 32 through the pipe section 31, valve 29 and a portion of pipe 182, because tank 183 is connected by a pipe 184, a check valve 185 and a pipe 186 to pipe 182. The tank 183 can be replenished with pressurized fluid when emergency tank 26 is thus pressurized by pipe 28 to which it is connected, a pipe 187, a check valve 188 and a pipe 189. The check valves 188 and 185 permit flow of pressurized fluid from pipe 187 to pipe 189 and from pipe 184 to pipe 182, respectively, and prevents reverse flow. The valve 188 prevents leaky valve 23 from bleeding while car 11 is standing for long periods of time.

OPERATION

In a normal humping operation in a railroad classification yard, a number of freight cars, that are joined by couplers 14 and 15 and by hose couplings 19 and 20 are to be pushed by a railroad engine to the crest of the hump. The angle cock of the second car (cock 18 of that car if it is moving from left to right as viewed in FIG. 1 with the engine to the left) is closed before hose coupling 14 of the first car and coupling 15 of the second car are disconnected. This results in loss of all pressure in pipe 16 of the first car, referred to as car 11. Pressurized fluid will flow from valve 23 to brake cylinder 32 to set the brakes of car 11. The valve 23 is now communicating tanks 25 and 26 with cylinder 32 via brake release valve 81, such as QRR valve. To stop this communication and to release the brakes, release valve 81 is manually set or tripped whereby air from cylinder 32 is vented through one chamber of valve 81 to the atmosphere. The pressurized fluid in tanks 25 and 26 no longer communicates with cylinder 32 (see U.S. 2,392,185), although the slide valves (not shown, but see U.S. 2,031,213) of valve 23 communicate these tanks with another chamber of brake cylinder release valve device 81 which no longer communicates with the first chamber.

Some operators of railway classification yards leave open angle cocks 17 and 18 of each car in a set of cars to be pushed by a locomotive over the hump with one car at a time being released by each push operation.

When the brake hose couplings 19 and 20 have been disconnected from brake couplings of adjacent cars, each brake pipe 16 loses its pressurized fluid. Then the pressure switch 87 operates to close contact 88. The coupling 14 of the first or leading car, i.e., car 11, is mechanically uncoupled from coupling 15 of the next car. The engine pushes the set of cars and stops when car 11 goes over the crest of the hump. The car 11 continues to move and rolls freely down the grade.

Because the locomotive was pushing car 11 with sufficient speed before uncoupling wheel axle 40 through belt drive 84 already operates alternator-rectifier 45 to provide a D.C. voltage to regulator 82. Because contact 88 of pressure switch 87 is already closed, line L-8 provides D.C. power to low-speed detector 112 via line L-13. The operating alternator-rectifier 45 is providing alternating current through line L-4, line L-11 pass filter 110, line L-12 to low-speed detector 112.

The speed of car 11, when pushed by the locomotive will be greater than the minimum for operation of detector 112. When such minimum is exceeded, detector 112 will energize relay 1CR to close contact 1-1CR to provide D.C. power from line L-8 via line L-14 and through either contact 1-1LS or contact 2-1LS, dependent upon the direction of movement of car 11, to operate the appropriate one of the object-sensing systems. This will include that transmitter-receiver, either 47 or 48, at the leading end of car 11 moving down the grade.

The pushing speed of car 11 should be sufficiently great that car 11 rolling down the grade will exceed the speed necessary to insure that car 11 will roll to the end of any final destination track. The engineer of the locomotive does not have sufficient information to determine the precise maximum pushing speed. Also, there are many other factors which determine the ultimate maximum speed reached by car 11. Another factor is the number of cars already on the final destination track. They reduce the distance that car 11 must roll freely.

When the speed of car 11 exceeds the predetermined maximum, high-speed detector 120 or 121 will receive D.C. power from line L-8 via line L-23 and either limit switch contact 1-2LS or contact 2-2LS, respectively. Thus the high-speed detector that is operated is dependent upon whether car 11 is loaded or unloaded.

For purpose of this description of this operation it is assumed that car 11 is unloaded. Thus high-speed detector 120 is now powered by receiving D.C. power through switch 1-2LS. The pass filter 122 does not immediately receive A.C. potential from alternator-rectifier 45 via transformer 83 and line L-4. It must wait the 20-second delay provided by switch 124. If the speed of the car 11 is above a predetermined maximum, A.C. current flows through pass filter 123 and its frequency is converted to a D.C. potential by detector 120 to operate the coil of relay 2CR via line L-29 connected to detector 120.

For illustration, it is assumed that (1) safe coupling speed is 3 m.p.h. and the predetermined speed for car 11 to reach the end of any of the final destination tracks is 11 m.p.h. Of course, a speed in excess of 11 m.p.h. will assure that car 11 will roll the maximum required distance but a higher speed will require stronger braking force to reduce car 11 to 3 m.p.h. when another car is sensed ahead within a predetermined range of distance. Obviously, an excessive speed cannot be reduced in time to a safe impact coupling speed.

Contact 88 is closed. Twenty seconds after alternator-rectifier provided D.C. potential, switch 124 closed. D.C.

power is being fed to detector 120. When the speed of car 11 exceeds 11 m.p.h., A.C. current flows through filter 122 and detector 120 to energize the coil of relay 2CR. After a delay, contact 1–2CR closes. This delay by contact 1–2CR prevents the immediate application of the brakes so as to minimize the number of braking cycles during the movement of car 11 along the tracks of the classification yard.

With contact 1–2CR closed, solenoid 30 is energized to operate valve 29 whereby pressurized fluid flows from emergency tank 26 to brake cylinder 32 to operate the brakes of car 11.

When the speed of car 11 is reduced to 11 m.p.h., the frequency of the A.C. potential is too small, for A.C. current to pass filter 122. The detector 120 will no longer provide a D.C. potential to relay 2CR. Thus contact 1–2CR opens to deenergize solenoid 30 whereby the spring of valve 29 returns valve 29 to its normal condition. The brake cylinder 32 now communicates through pipe 31 to valve 29 which is now in its condition whereby air can be exhausted to the atmosphere through valve 100.

The valve 100 was moved from its normal condition by the energization of solenoid 101. This occurred when contact 1–1LR closed, after contact 1–2CR was closed to energize latch relay 1LR. Although contact 1–2CR opens upon the deenergization of relay 2CR, contact 1–1LR remains closed. Thus solenoid 101 remains energized and valve 100 will exhaust pressurized fluid from brake cylinder 32 for all subsequent braking operations of car 11 in the classification operation.

Each time that car 11 exceeds 11 m.p.h. the cycle of braking and brake releasing is carried out automatically.

As already indicated low-speed detector 112 is energizing relay 1CR so that contact 1–1CR is already closed. With the indicated direction of movement of car 11 switch contact 2–1LS is closed and contact 1–1LS is open. Thus D.C. potential is furnished the object-sensing system that includes oscillator 117 and pulser 118 to operate transmitter-receiver 48. For this description of the operation it is assumed that amplifier-rectifier 142 will receive pulses of A.C. energy only when the car to be sensed is between 20 and 40 to 75 feet ahead of car 11. This will occur when car 11 reaches the final destination track and is within 40 to 75 feet of a car already on that track. When this happens car 11, traveling under control at 11 m.p.h. by its object-sensing system, will sense the car ahead. As a result, relay 5CR will be energized to close contact 1–5CR to energize solenoid 30 for the movement of valve 29 from its normal condition. The tank 26 again communicates with brake cylinder 32 to apply the brakes of car 11. This brake application will continue until car 11 is reduced to the speed of 3 m.p.h. At this speed the frequency of A.C. potential will not pass filter 110. The detector 112 will cease energization of relay 1CR. The contact 1–1CR opens. The D.C. power to the object-sensing system ceases. The relay 5CR is deenergized. The contact 1–5CR opens. The solenoid 30 is deenergized. The valve 29 returns to its normal condition so that brake cylinder 32 no longer communicates with emergency tank 26 through valve 29 via line L–182, valve 181, line L–180 and line L–28. Instead brake cylinder 32 communicates via sections of brake pipe control 31 and valve 100 to the atmosphere. The car 11 rolls freely toward the car ahead. At this speed and for the distance to be traveled, car 11 will impact the car ahead at a safe coupling speed.

In the event that car 11 is a loaded car, the pre-determined speed as a minimum speed necessary to reach the end of the final destination track is, for example, 8 m.p.h. At this speed car 11 can be reduced to a safe coupling speed upon sensing another car, e.g., 40 to 75 feet ahead in the case of the illustrative object-sensing predetermined range of 20 to 75 feet. This speed value is stated for the car that unloaded is permitted to travel 11 m.p.h., as described above.

Larger and heavier cars are being built. Some of these, especially when loaded, should operate at a maximum speed of about 6 m.p.h., for example, when loaded to reach the end of the final destination track and yet be able to be slowed to the safe coupling speed upon sensing a car ahead within a predetermined range of distance, as mentioned above. This lower speed is not required if the heavier car has better brakes which is usually the case.

Not all cars to be assembled for a train have the same weight unloaded. Some cars will be loaded and others will be unloaded or empty. Accordingly, cars being directed to the same final destination track can be operated by the present invention at different controlled maximum speeds for free rolling before sensing a car ahead that is already stopped on the final destination track. Accordingly, it is easily seen that a free moving car that has been humped can be traveling at a higher speed than a free rolling car that has been just previously moved over the crest.

Assuming now, that the car ahead is a heavy car and is loaded, its maximum speed necessary to reach the end of the destination track but permitting adequate braking upon sensing an object ahead that is stopped, may be 6 m.p.h. The car following may be free rolling under control at 11 m.p.h. If both cars are sufficiently upstream from the final destination track or the portion of it where they will ultimately stop, it is seen that the second car could catch up to and impact the slower moving car ahead. In this illustrative case the relative speed of the faster car is 5 m.p.h. which is not a safe impact coupling speed. For this reason the invention includes a relative speed-sensing system that will permit the faster car to catch up to the other car, but will slow it down under control so that the impact speed will be the safe speed.

Using the illustrative speeds mentioned above, and with car 11 being the faster moving car and moving in the direction indicated above, radar device 119, transmitter 151 and receiver 153 will operate to sense the railroad car ahead. The radar device 119 will signal the relative speed as a D.C. potential to voltage comparator 162. As explained above, comparator 162 indicates by a D.C. potential that represents the speed at which car 11 should be traveling and this as a D.C. voltage will be compared by voltage comparator 163. The voltage comparator 163 will energize relay 7CR if it indicates that car 11 is traveling faster than it should for a safe impact speed. This will result in the closing of contact 1–7CR to energize solenoid 30 thereby operating valve 29 to apply the brakes. As the speed of car 11 is reduced continuous comparison will be made by voltage comparators 162 and 163 until car 11 is at the safe impact speed. Then coil 7CR will be deenergized to open contact 1–7CR and thereby deenergize solenoid 30 to return valve 29 to its normal condition whereby brake cylinder 32 will vent its pressurized fluid through valve 100 to the atmosphere.

The car 11 continues to move and overtake the car ahead at a relative speed that is a safe coupling speed. Eventually car 11 will be behind the other car by a distance within the range of distance to energize coil 5CR of the object-sensing system, having oscillator 117, pulser 118 and transmitter-receiver 48. This will close contact 1–5CR for the application of the brakes. If this were to happen, car 11 by the application of brakes would be slowed to 3 m.p.h., and thereby would never reach the car ahead. Furthermore, car 11 would now be at a speed at which it would not reach its desired destination in the desired destination track where it would couple to the car ahead that would then be stationary. The voltage comparator 162 has already energized coil 8CR to open contact 2–8CR in the circuit with contact 1–5CR. So long as the car ahead is sensed as moving, the object-sensing system that includes relay 5CR cannot apply brakes to car 11 by the closing of contact 1-5CR to reduce its speed to 3 m.p.h. Accordingly, car 11 at the safe coupling speed, which is 9 m.p.h. in this illustration, will continue to move until it couples with the car ahead.

After car 11 is thus coupled, radar device 119 is no longer effective to apply the brakes, because there is no longer any relative speed between car 11 and the car ahead. The object-sensing system, including a coil 5CR, can no longer apply the brakes of car 11 because all echo pulses will be from the car ahead that is less than the minimum of the range of distance at which the object-sensing system operates to apply the brakes. The coupled cars will continue to roll along the tracks to the desired destination track. The final braking will be done by the car ahead. Its automatic brake control system will operate in the normal manner to slow the speed of the two coupled cars to the safe coupling speed, whereby the car ahead will couple to a stationary car on the final destination track.

In an emergency braking operation initiated by the locomotive engineer or by a conventional automatic system for a train, in less than 20 seconds the brakes are fully set to reduce the train speed by the operation of control valve 23 in its several stages, as explained in said pamphlet No. 5062 of Westinghouse on the AB brake valve, that prevents damaging shocks due to brake action. Thus brake cylinder 32 has received full pressure from emergency reservoir tank 26 and auxiliary tank 25. After the delay, e.g. 20 seconds, when the coil of relay 2CR or 3CR is energized by the operation of thermal time-delay switch 124, solenoid 30 will be energized to communicate brake cylinder 32 only with tank 26.

Also, when relay 2CR or 3CR is deenergized by car 11 being slowed to a speed just below the minimum speed at which detector 120 or 121 will operate, valve 29 will return to its normal condition in which brake cylinder 32 communicates again with brake control valve 23 without any release of braking pressure.

If loss of pressure in pipe 16 in an emergency braking operation resulted in the immediate operation of relay 2CR or 3CR, valve 29 would operate to apply braking action by pressurized fluid at once and only from tank 26. This could result in damaging shocks to goods in coupled cars of a train. Also the braking force would be less until relay 2CR or 3CR is deenergized when valve 29 will return to its normal condition mentioned above.

Because of the time delay, the normal train emergency braking operation is not affected. For the normal service braking operation in which the pressure in pipe 16 is never at a pressure below about 20 p.s.i.g., the time delay has no advantage.

Assuming there is no coupling with a moving car ahead, car 11 at the final destination track couples safely by impact at 3 m.p.h. to a stopped car already on the destination track. By the foregoing operation, the cars become mechanically coupled on that track. Their brake couplings 19 and 20 are then connected. All closed angle cocks 17 and 18 are then opened. One of the end cars is then mechanically coupled to a locomotive to constitute a train. One of its brake hose couplings of that car is connected to the hose coupling of the locomotive. The locomotive then furnishes pressure fluid, such as pressurized air, to the brake pipes 16 of the cars. This pressurized fluid is furnished the control valves 23 and pressure switches 87 to open contacts 88 and close contacts 89. The control valve 23 on each of the cars is operated by the pressurized fluid, in the well known manner, to shift the valve to its release condition. As a result, pressurized fluid between control valve 23 and release valve device 81 is vented, so that valve device 81 is returned to its normal condition. Thereby the pressure of fluid in the section of pipe 31 between valve device 81 and valve 100 is released.

When valve 29 was returned to its normal condition, the sections of pipe 31 between valve 100 and brake cylinder 32 have their pressure released to the atmosphere. These two sections of control pipe 31 later communicated with that section of pipe 31 between valve 100 and release valve device 81 when contact 88 opened, but, of course, contact 1-1LR remains closed.

When the train starts moving at a sufficient speed, alternator-rectifier 45 through voltage regulator 82 and now closed contact 89 provides a D.C. voltage through line L-9 to latch relay 1LR to release that relay. As a result, contact 1-1LR opens to deenergize solenoid 101. This results in valve 100 returning to its normal condition whereby the two sections of control pipe 31 now communicate with the third section of pipe 31. Thus control valve 23 through release valve device 81 now communicates directly with brake cylinder 32 which is the normal condition for the conventional operation of the brake system used in cars of a train that do not have the brake control system of the present invention. So long as car 11 remains part of the train, the conventional brake system can operate in the normal manner for an ordinary braking operation and for an emergency braking operation.

The foregoing description of the preferred embodiment and its operation has been in relationship to a hump type of railroad car classification system. Obviously, the system of the present invention is equally applicable to the other type of railroad car classification, namely, the flat type in which a car does not roll down a grade after leaving a locomotive that has pushed it. Instead in the flat type operation the locomotive pushes the car until the car has attained a sufficient speed so that it will roll freely along a flat track to the end of any of the ultimate destination tracks.

The switch 1SW is used only to show an alternative embodiment in which a battery 200 is used as the D.C. electric power source. In such case line L-6a is connected by switch 1SW in its other position via a line L-6b to battery 200 connected to ground potential. In this alternative embodiment battery 200 provides D.C. power for all components by line L-8 or line L-9 through lines shown or those not shown for clarity but obviously present. In this embodiment, alternator-rectifier 45 is used only to provide the A.C. (frequency) signals to isolation transformer 83 and thus is only and can be merely an A.C. generator. The lines L-5 and L-6 and regulator 82 would be absent.

When battery 200 is used via switch 1SW to provide D.C. power, relay 1LR will be unlatched as soon as contact 89 closes. This will result in the opening of contact 1-1LR about the same time that contact 88 is opened to deenergized solenoid 101 to return valve 100 to its normal condition.

To prevent the operation of the substitute A.C. generator, in the alternative embodiment mentioned above, during normal movement of car 11 as part of a train, an electric clutch 201 (FIG. 10) is located in drive 84. The clutch 201 is normally engaged but is disengaged when energized. The clutch 201 is connected by a line L-70 to line L-9 and is connected to ground potential. When clutch 201 is energized by battery 200 upon the closing of contact 89 by pressurized air fed into brake pipe 16, clutch 201 is disengaged and the substitute A.C. generator is no longer operated by driving its rotor.

In the embodiment using alternator-rectifier 45 and voltage regulator 82 for D.C. power an electric clutch (not shown) could be used also in drive 84 to render the alternator-rectifier inoperative during the time that sufficient fluid pressure is in brake pipe 16, such as operation of a train including car 11. The clutch would be the normally-disengaged type and would be connected by a line (not shown) to one terminal of a normally-closed contact (not shown) of switch 87 which has its other terminal connected to a battery (not shown). In this case, line L-70 is not present. Thus loss of pressure in pipe 16 results in energization of this clutch to engage it so that wheel axle 40 can drive the rotor of alternator-rectifier 45.

A normally-disengaged type of electric clutch (not shown) can be used in place of clutch 201 in the embodiment using battery 200 as the D.C. power source. In this case line L–70 is absent and a line (not shown) connects this clutch to one terminal of a normally-closed contact (not shown) of pressure switch 88. The other terminal of that contact is connected by a line (not shown) to line L–6b or directly to battery 200. Thus, when sufficient pressure is lost in pipe 16, this clutch will be energized so that the substitute A.C. generator will be driven, when car 11 is pushed for classification by humping or flat free rolling, to provide frequency signals.

The brake system of the present invention can be modified in a number of other ways that are also obvious modifications. For example, instead of operating alternator-rectifier 45 by a drive means from wheel axle 40, the drive can be provided by frictional rotating contact with one of wheels 12. The drive can be by a separate wheel that will ride on track 13. In the case of the separate wheel, it can be mounted on a pivoted arm that is spring urged against rail 13 for the railroad classification operation, but the arm can be lifted away from track 13 and locked in lifted position when car 11 is part of a train. Of course, in this case the described system using latch relay 1LR and solenoid valve 100 would require suitable modification so that valve 100, if present, would be returned to its normal condition prior to the movement of car 11 as part of the train.

Many modifications of the present invention will be apparent to one skilled in the art. The foregoing description of the preferred embodiment is presented merely for purpose of illustration. The invention is limited only by the claims that follow.

We claim:
1. An automatic system for reducing the speed of a moving vehicle, having a fluid brake system including a brake pipe and a brake coupling connected to the brake pipe to join the brake system to a brake coupling of a brake system on another vehicle, to a predetermined lower speed at which the moving vehicle can couple automatically to another vehicle in a safe manner, which comprises the following interrelated components adapted to be mounted on the moving vehicle:
   (1) pressure-sensitive means operable in response to a loss of fluid pressure in at least one of said brake coupling and said brake pipe of the moving vehicle to a predetermined maximum fluid pressure;
   (2) power-operated speed-sensing means operable in response to a predetermined minimum speed of the moving vehicle;
   (3) power-operated object-detecting means operable in response to detection of another vehicle in the path of travel of the moving vehicle within a predetermined maximum distance;
   (4) power-operated means operable to alternatively apply and release braking means on said moving vehicle;
   (5) electric power means adapted to operate said object-detecting means, said speed-sensing means and said power-operated means for said braking means;
   (6) means operatively connecting said electric power means to said speed-sensing means upon operation of said pressure-sensitive means;
   (7) means operatively connecting said electric power means to said object-detecting means upon operation of said pressure-sensitive means and of said speed-sensing means; and
   (8) means operatively connecting said electric power means and said power-operated means to apply said braking means only during the time and in response to the operation of said object-detecting means.

2. The automatic system of claim 1 and further including:
   (1) second power-operated object-detecting means operable in response to the detection of another vehicle in the opposite path of travel of the moving vehicle within a predetermined maximum distance;
   (2) direction-sensing means operable in response to movement of said moving vehicle in said opposite path of travel;
   (3) means operatively connecting said electric power means to said second object-detecting means upon operation of said pressure-sensitive means, said direction sensing means, and said speed-sensing means and during the same period of time operatively disconnecting said electric power means to said first-mentioned object-detecting means; and
   (4) second means operatively connecting said electric power means and said power-operated means to apply said braking means only during the time and in response to the operation of said second object-detecting means.

3. The automatic system of claim 1 and further including:
   (1) second power-operated speed-sensing means operable in response to a predetermined minimum speed of the moving vehicle greater than said predetermined minimum speed at which said first-mentioned speed-sensing means is operable;
   (2) means operatively connecting said electric power means to said second speed-sensing means upon operation of said pressure-sensitive means; and
   (3) second means operatively connecting said electric power means and said power-operated means to apply said braking means only during the time and in response to the operation of said second speed-sensing means.

4. The automatic system of claim 3 and further including means to delay for a predetermined period of time the operation of said means operatively connecting said electric power means and said second speed-sensing means.

5. The automatic system of claim 3 wherein said second speed-sensing means is adjustable to be operable at two predetermined minimum speeds of the moving vehicle and said system further including:
   (1) weight-sensing means to discriminate between the weight of the moving vehicle in unloaded condition and the weight of the moving vehicle in loaded condition; and
   (2) means operable in response to the operation of said weight-sensing means indicating a loaded condition for the vehicle to operate said second speed-sensing means at the lower of said two predetermined minimum speeds.

6. The automatic system of claim 5 and further including:
   (1) power-operated time-delaying means to delay for a predetermined period of time the brake-applying operation of said second means operatively connecting said electric power means and said power-operated means to apply said braking means; and
   (2) power-operated means operative in response to the operation of said first speed-sensing means to operatively connect said electric power means and said time-delay means.

7. The automatic system of claim 3 and further including:
   (1) second power-operated object-detecting means operable in response to the detection of another vehicle in the opposite path of travel of the moving vehicle within a predetermined maximum distance;
   (2) direction-sensing means operable in response to movement of said moving vehicle in said opposite path of travel;
   (3) means operatively connecting said electric power means to said second object-detecting means upon operation of said pressure-sensitive means, said direction-sensing means, and said second speed-sensing means and during the same period of time operatively disconnecting said electric power means to said first-mentioned object-detecting means; and (4) third means operatively connecting said electric power means and said power-operated means to apply said braking means only during the time and in response to the operation of said second object-detecting means.

8. The automatic system of claim 7 and further including means to delay for a predetermined period of time the operation of said means operatively connecting said electric power means and said second speed-sensing means.

9. The automatic system of claim 8 wherein said second speed-sensing means is adjustable to be operable at two predetermined minimum speeds of the moving vehicle and said system further including:

(1) weight-sensing means to discriminate between the weight of the moving vehicle in unloaded condition and the weight of the moving vehicle in loaded condition; and (2) means operable in response to the operation of said weight-sensing means indicating a loaded condition for the vehicle to operate said second speed-sensing means at the lower of said two predetermined minimum speeds.

10. The automatic system of claim 9 and further including:

(1) power-operated time-delaying means to delay for a predetermined period of time the brake-applying operation of said second means operatively connecting said electric power means and said power-operated means to apply said braking means; and (2) power-operated means operative in response to the operation of said load-indicating means to operatively connect said electric power means and said time-delay means.

11. The automatic system of claim 10 and further including:

(1) first and second power-operated relative speed-sensing means, having a transmitter and a receiver for wave energy at the ends of the moving vehicle and being operable in response to a vehicle ahead of the moving vehicle;

(2) means selectively operable by said direction-sensing means to operatively connect said electric power means to that relative speed-sensing means, which is at the same end as the object-sensing means which is also operatively connected;

(3) means to indicate the absolute speed of the moving vehicle;

(4) first speed-comparing means to indicate slower actual movement of a downstream vehicle by comparing said relative speed indicated by operation of one of said first and second relative speed-sensing means and the speed indicated by said absolute speed-indicating means;

(5) means responsive to operation of said first speed-comparing means to operatively disconnect, only during such response, both of said means operatively connecting said electric power means to said power-operated brake-applying means in response to operation of said object-sensing means;

(6) second speed-comparing means to indicate said actual speed is greater than the sum of said relative speed and the predetermined minimum speed at which said first-mentioned speed-sensing means is operative; and (7) means operatively connecting said electric power means and said power-operated brake-applying means only during the time and in response to the operation of said either second speed-comparing means.

12. The automatic system of claim 11 wherein:

(1) one of said speed-sensing means provides an A.C. voltage varying in frequency with the speed of the moving vehicle;

(2) said absolute speed-indicating means provides a D.C. voltage having a value dependent upon the frequency of the A.C. voltage provided by said speed-sensing means;

(3) said relative speed-sensing means provide a D.C. voltage indicating the speed at which the moving vehicle is moving faster than the vehicle ahead;

(4) said first speed-comparing means receives and compares said D.C. voltages to indicate by a D.C. voltage a slower actual movement of the vehicle ahead;

(5) said means responsive to said first speed-comparing means includes a relay, having normally-closed contacts and a coil energized by said D.C. voltage provided by said speed-comparing means, said contacts being in the circuits of said means operatively connecting said electric power means and said brake-applying means in response to the operation of said first object-detecting means and of said second object-detecting means;

(6) said first speed-sensing means provides a D.C. voltage to indicate the predetermined minimum speed at which said first speed-sensing means is operative;

(7) said second speed-comparing means receives and adds said predetermined minimum speed and said D.C. voltage indicating actual speed of the vehicle ahead and subtracts this sum from said D.C. voltage indicating actual speed of the moving vehicle; and (8) each of said means responsive to a D.C. voltage of one of said second speed-comparing means includes a relay having a normally-open contact and a coil energized by D.C. voltage provided by one of said second speed-comparing means, each of said normally-open contacts, when closed, operatively connecting said electric power means to said power-operated brake-applying means.

13. In a brake system for a railway car having (a) a brake cylinder to apply and release brakes for wheels on trucks supporting a car frame having a longitudinally-extending central sill supporting at each of its ends a car coupler, (b) a brake pipe mounted on the car frame, (c) a pair of valved brake pipe couplings connected to the ends of the brake pipe and to be connected to brake couplings of coupled cars, (d) a control valve selectively communicating either the brake pipe with (e) an auxiliary tank, and (f) an emergency tank or (g) a brake control pipe connected to the brake cylinder with either tank or with a vent outlet of the control valve with the control valve being operable upon slight and substantial reduction of pressure in the brake pipe to communicate the brake cylinder with the auxiliary and emergency tanks for ordinary and emergency braking operation, respectively, the improvement which comprises an automatic system for controlling the speed of the car when free rolling in one direction uncoupled to any car in that direction whereby the moving car is reduced to a predetermined lower speed at which it can couple automatically to another railway car in a safe manner, said automatic system being mounted on the car and comprising:

(1) power means to provide a source of a relatively constant D.C. voltage;

(2) an alternator to provide an A.C. voltage;

(3) means driven by movement of the car to operate said alternator;

(4) a pressure switch connected to one of said brake pipe and said brake couplings and having a normally-closed contact that is opened when said pressure switch indicates a predetermined minimum fluid pressure in the pipe to which it is connected;

(5) speed-sensing means connected to said D.C. power means by said normally-closed contact and connected to said A.C. voltage to create a voltage varying with variation of the frequency of said A.C. voltage when said frequency exceeds a predetermined value indicating a car speed greater than said predetermined speed;

(6) voltage-responsive means, including a relay having a normally-open contact and a coil, connected to said speed-sensing means and to provide current through said coil when said voltage is sufficient to indicate a car speed exceeding said predetermined speed;

(7) a transmitter-receiver mounted on each end of the car capable of sending pulses of wave energy and receiving pulses of echo wave;

(8) means connected to at least one of said transmitter-receivers to send a pulse of wave energy to said transmitter-receivers and transmit any echo pulse of wave energy from said transmitter-receivers received from a predetermined maximum distance before another pulse of energy is provided for transmission;

(9) means responsive to the transmitted echo pulse and comprising a high pass filter and amplifier;

(10) voltage-generating means operatively connected to said amplifier and responsive to a predetermined range of frequency of the amplified wave energy indicating the echo was from an object within a predetermined range of distance;

(11) a relay having a normally-open contact and a coil responsive to said voltage-generating means;

(12) a solenoid 3-way valve with one inlet port and the outlet port interposed in the brake control pipe and with the other inlet port connected to a tank as a source of pressurized fluid, whereby the 3-way valve when said solenoid is deenergized communicates the brake cylinder with the control valve and when the solenoid is energized communicates the tank with the brake cylinder; and

(13) electrical-conducting means connecting said solenoid to said D.C. power source through said normally-closed contact of said pressure switch and said normally-open contact of said relay operative by said speed-sensing means.

14. The brake system of claim 13 wherein:
(1) said power means to provide a D.C. voltage comprises said alternator as an alternator-rectifier and a voltage regulator electrically connected to said rectifier; and
(2) wherein the alternator-driving means comprises a belt, a pulley mounted on the shaft of the alternator and a pulley mounted on an axle of the car.

15. The brake system of claim 14 wherein the 3-way valve has said other inlet port connected to at least one of said auxiliary and emergency tank, whereby said tank serves as said pressurized fluid source.

16. The brake system of claim 15 wherein said emergency tank is connected to said other inlet port of said 3-way valve.

17. The brake system of claim 16 wherein said two transmitter-receivers are capable of sending pulses of utrasonic energy and the means to provide energy pulses and the means to receive echo pulses are constructed to operate with ultrasonic energy.

18. The brake system of claim 17 wherein:
(1) a second selenoid 3-way valve is interposed in the brake control pipe between said first-mentioned solenoid valve and the control valve;
(2) said pressure switch has a normally-open contact; and
(3) a latching relay is electrically connected to said normally-open contact of said pressure switch to release said relay upon closing of said normally-open contact and being connected to said means electrically connecting said first solenoid valve to energize said latching relay whenever said first solenoid valve has its solenoid energized, said latching relay having a normally-open contact electrically connected to the normally-closed contact of said pressure switch and to the solenoid of said second solenoid valve, whereby said second solenoid valve when its solenoid is energized freely vents air from the brake cylinder and stops communication between the control valve and the first solenoid valve but is unlatched with return of second solenoid valve to its normal position communicating the control valve with the first solenoid valve and thereby with the brake cylinder when pressure is sufficiently restored in the control pipe to close the normally-open contact of the pressure switch.

19. The brake system of claim 13 wherein said power means to provide a D.C. voltage comprises said alternator as an alternator-rectifier and a voltage regulator electrically connected to said rectifier and said system further including:
(1) second speed-sensing means connected to said D.C. power means by said normally-closed contact of said pressure switch and connected to said A.C. voltage to create a voltage varying with change of the frequency of said A.C. voltage when said frequency exceeds a second predetermined value indicating a car speed greater than second predetermined speed;
(2) time-delay relay means electrically connected to said D.C. power means by said normally-closed contact of said pressure switch, said time-delay relay means including a normally-open contact interposed in the electrical connection between said second speed-sensing means and said alternator providing the A.C. voltage, whereby A.C. voltage is applied to said second speed-sensing means after a delay following the closing of said normally-closed contact of said pressure switch; and
(3) second voltage-responsive means, including a relay having a normally-open contact and a coil, connected to said second-speed sensing means and to provide a current through said coil when said voltage is sufficient to indicate a car speed exceeding said second predetermined speed;
(4) electrical-conducting means connecting said solenoid to said D.C. power source through said normally-closed contact of said pressure switch and said normally-open contact of said relay operative by said second speed-sensing means.

20. The brake system of claim 19 further including:
(1) weight-sensing means including a pair of switches and means to selectively move one switch to closed position and the other to an open position or vice versa, depending upon the weight of the moving vehicle including any goods in it, one of said switches when closed, to indicate a loaded vehicle, electrically connecting said second speed-sensing means to said normally-open contact of said pressure switch;
(2) third speed-sensing means connected to said D.C. power means by said normally-closed contact of said pressure switch and connected to said A.C. voltage to create a voltage varying with change of the frequency of said A.C. voltage when said frequency exceeds a third predetermined value indicating a car speed greater than second predetermined speed;
(3) third voltage-responsive means, including a relay having a normally-open contact and a coil, connected to said third speed-sensing means and to provide a current through said coil when said voltage is sufficient to indicate a car speed exceeding said third predetermined speed; and
(4) electrical-conducting means connecting said solenoid to said D.C. power source through said normally-closed contact of said pressure switch and said normally-open contact of said relay operative by said third speed-sensing means.

21. The brake system of claim 20 wherein:
(1) said driven means to operate said alternator-rectifier comprises a belt, a pulley mounted on the shaft of the alternator and a pulley mounted on an axle of the car;

(2) wherein said solenoid 3-way valve is connected to the emergency tank as the source of pressurized fluid; and (3) said two transmitter-receivers are capable of sending pulses of ultrasonic energy and the means to provide energy pulses and the means to receive echo pulses are constructed to operate with ultrasonic energy.

22. The brake system of claim 21 wherein:

(1) a second solenoid 3-way valve is interposed in the brake control pipe between said first-mentioned solenoid valve and the control valve;

(2) said pressure switch has a normally-open contact; and (3) a latching relay is electrically connected to said normally-open contact of said pressure switch to release said relay upon closing of said normally-open contact and being connected to said means electrically connecting said first solenoid valve to energize said latching relay whenever said first solenoid valve has its solenoid energized, said latching relay having a normally-open contact electrically connected to the normally-closed contact of said pressure switch and to the solenoid of said second solenoid valve, whereby said second solenoid valve when its solenoid is energized freely vents air from the brake cylinder and stops communication between the control valve and the first solenoid valve but is unlatched with return of second solenoid valve to its normal position communicating the control valve with the first solenoid valve and thereby with the brake cylinder when pressure is sufficiently restored in the control pipe to close the normally-open contact of the pressure switch.

23. The brake system of claim 22 and further including:

(1) a third tank to receive pressurized fluid;

(2) valved pipe means communicating said third tank with said other inlet port of said first solenoid 3-way valve; and (3) means including a pipe and a check valve to communicate said third tank with said emergency tank, said check valve permitting flow of fluid from the emergency tank to said third tank, said brake control pipe between said emergency tank and said solenoid valve containing a valve, whereby pressurized fluid can flow selectively from the emergency tank or from the third tank to the brake cylinder.

24. The brake system of claim 23 and further including:

(1) first and second power-operated relative speed-sensing means, having a transmitter and a receiver for wave energy at the ends of the moving vehicle and being operable in response to a vehicle ahead of the moving vehicle, to provide a D.C. voltage indicating the speed at which the moving vehicle is overtaking the vehicle ahead;

(2) means selectively operable by said direction-sensing means to operatively connect said electric power means to that relative speed-sensing means which is at the same end as the operating object-sensing means;

(3) means to indicate the absolute speed of the moving vehicle by providing a D.C. voltage having a value dependent upon the frequency of the A.C. voltage provided by said speed-sensing means;

(4) speed comparing means that receives and subtracts from said D.C. voltage indicating absolute speed of the moving vehicle the D.C. voltage indicating the relative speed to obtain (a) a D.C. voltage indicating the car ahead is moving and receives and also adds the D.C. voltage indicating the minimum speed at which the first-mentioned speed-sensing means is operative to obtain as a D.C. voltage indicating the safe overtaking speed for the moving vehicle;

(5) means to compare said D.C. voltage indicating the safe overtaking speed from said speed-comparing means with said D.C. voltage of said second speed-sensing means and when the latter voltage is greater than the former to provide a D.C. voltage;

(6) means responsive to said last-mentioned D.C. voltage that includes a relay having a normally-open contact and a coil;

(7) means operatively connecting said D.C. power source, through said normally-closed contact of said pressure switch and said normally-open contact of said last-mentioned relay, to said first-mentioned solenoid;

(8) means responsive to said D.C. voltage indicating the car ahead is moving that includes a relay having a normally-closed contact and a coil, said normally-closed contacts being in series with said normally-open contact of said relay responsive to said voltage-generating means indicating an object is within a predetermined range of distance.

25. The brake system of claim 19 wherein both said first and second speed-sensing means including a high-pass filter with the frequencies of alternating current passed by the filter for said first speed-sensing means including frequencies lower than those passed by the filter for the second speed-sensing means.

26. An automatic system for reducing the speed of a moving vehicle, having a brake system and coupling means adapted to couple automatically at a required minimum impact speed to complementary coupling means on another vehicle, to a predetermined lower speed at which the coupling means of the moving vehicle can couple automatically to the complementary coupling means of said another vehicle by impact in a safe manner, which comprises the following interrelated components adapted to be mounted on the moving vehicle:

(1) signal-providing means for responding to a free-moving, coupling-by-impact condition of the brake system of the moving vehicle to provide said signal when the vehicle is free moving;

(2) speed-sensing means to signal at least a predetermined minimum speed of the moving vehicle in excess of a safe coupling-by-impact speed;

(3) object-detecting means operable to provide a signal upon detection of another vehicle in the path of travel of the moving vehicle at a predetermined maximum distance;

(4) power-operated means operable to alternatively apply and release braking means of the brake system on said moving vehicle; and (5) power-initiating means for initiating the operation of said power-operated means to operate said brake system only in response to the production of signals from (a) said object-detecting means, (b) said speed-sensing means signaling said excessive speed and (c) said signal-providing means responding to said free-moving, coupling-by-impact condition of the brake system of the moving vehicle.

27. Apparatus for use in the automatic coupling of vehicles to each other at a predetermined safe impact speed, comprising:

(1) echo-utilizing, object-detecting means mountable on a first movable vehicle, having a braking system, for sensing the presence and range of another vehicle in the path of travel of the first vehicle when said first vehicle is moving;

(2) signal-producing means for responding to a free-moving, coupling-by-impact condition of the said first movable vehicle;

(3) speed-sensing means to provide a signal by responding to a speed of said first movable vehicle in excess of a safe coupling-by-impact speed;

(4) braking-initiating means for responding to the combination of signals from (a) said object-detecting means, (b) said signal-producing means and (c) said speed-sensing means to automatically operate the brake system of said first vehicle; and
(5) brake-releasing means for responding to the discontinuance of a signal from said speed-sensing means to discontinue said automatic braking when the speed of said first vehicle when moving has been reduced to said safe impact speed so as to permit said first vehicle thereafter to coast into a safe impact with said another vehicle.

References Cited

UNITED STATES PATENTS

| | | |
|---|---|---|
| 2,702,342 | 2/1955 | Korman. |
| 2,762,913 | 9/1956 | Jepson. |
| 2,804,160 | 8/1957 | Rashid _____ 246—30 XR |
| 2,974,304 | 3/1961 | Nordlund. |
| 3,305,682 | 2/1967 | Bolster et al. _____ 246—167 |

ARTHUR L. LA POINT, *Primary Examiner.*

STANLEY T. KRAWCZEWICZ, *Examiner.*